United States Patent
Blom et al.

(10) Patent No.: US 11,917,055 B2
(45) Date of Patent: *Feb. 27, 2024

(54) METHOD AND ARRANGEMENT IN A TELECOMMUNICATION SYSTEM

(71) Applicant: TELEFONAKTIEBOLAGET LM ERICSSON (PUBL), Stockholm (SE)

(72) Inventors: Rolf Blom, Jarfalla (SE); Gunnar Mildh, Sollentuna (SE); Karl Norrman, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/366,098

(22) Filed: Jul. 2, 2021

(65) Prior Publication Data

US 2021/0328775 A1 Oct. 21, 2021

Related U.S. Application Data

(63) Continuation of application No. 16/565,796, filed on Sep. 10, 2019, now Pat. No. 11,075,749, which is a
(Continued)

(51) Int. Cl.
*H04L 9/08* (2006.01)
*H04W 8/20* (2009.01)
(Continued)

(52) U.S. Cl.
CPC ............ *H04L 9/083* (2013.01); *H04L 9/0816* (2013.01); *H04L 9/0869* (2013.01);
(Continued)

(58) Field of Classification Search
CPC ..... H04L 9/083; H04L 9/0816; H04L 9/0869; H04L 63/062; H04L 2209/24;
(Continued)

(56) References Cited

U.S. PATENT DOCUMENTS 5,987,139 A 11/1999 Bodin
7,152,238 B1 12/2006 Dommety et al.
(Continued)

FOREIGN PATENT DOCUMENTS

CN 101720539 A 6/2010
CN 101803271 B 12/2012
(Continued)

OTHER PUBLICATIONS

3GPP TSG SA WG3 Security—S3#45 TDoc S3-060648 Dulles, US, Oct. 31-Nov. 3, 2006.
(Continued)

*Primary Examiner* — Techane Gergiso

(57) ABSTRACT

A method in a User Equipment (UE) of an Evolved Packet System (EPS) establishes a security key (K_eNB) for protecting Radio Resource Control/User Plane (RRC/UP) traffic exchanged with a serving eNodeB. The method comprises sending a Non-Access Stratum (NAS) Service Request to a Mobility Management Entity (MME), the request indicating a NAS uplink sequence number (NAS_U_SEQ). The method further comprises receiving an indication of the NAS_U_SEQ of the NAS Service Request sent to the MME, back from the MME via the eNodeB. The method further comprises deriving the K_eNB from at least the received indication of the NAS_U_SEQ and from a stored Access Security Management Entity-key (K_ASME) shared with said MME.

16 Claims, 6 Drawing Sheets

Related U.S. Application Data continuation of application No. 16/043,596, filed on Jul. 24, 2018, now Pat. No. 10,455,417, which is a continuation of application No. 15/443,229, filed on Feb. 27, 2017, now Pat. No. 10,057,055, which is a continuation of application No. 14/568,329, filed on Dec. 12, 2014, now Pat. No. 9,615,249, which is a continuation of application No. 14/151,077, filed on Jan. 9, 2014, now Pat. No. 8,938,076, which is a continuation of application No. 12/677,675, filed as application No. PCT/SE2008/050591 on May 20, 2008, now Pat. No. 8,660,270.

(60) Provisional application No. 60/972,955, filed on Sep. 17, 2007.

(51) Int. Cl.
  *H04W 12/041* (2021.01)
  *H04W 12/0471* (2021.01)
  *H04W 92/10* (2009.01)
  *H04L 9/40* (2022.01)

(52) U.S. Cl.
  CPC ............. *H04L 63/062* (2013.01); *H04W 8/20* (2013.01); *H04W 12/041* (2021.01); *H04W 12/0471* (2021.01); *H04L 2209/24* (2013.01); *H04L 2209/80* (2013.01); *H04L 2463/061* (2013.01); *H04W 92/10* (2013.01)

(58) Field of Classification Search
  CPC ......... H04L 2209/80; H04L 2463/061; H04W 12/0471; H04W 12/041; H04W 8/20; H04W 92/10
  See application file for complete search history.

(56) References Cited

U.S. PATENT DOCUMENTS

| | | | |
|---|---|---|---|
| 7,403,621 B2 | 7/2008 | Vialen | |
| 8,014,307 B2 | 9/2011 | Vialen | |
| 8,213,903 B2* | 7/2012 | Pudney | H04W 12/069 |
| | | | 455/452.2 |
| 8,457,659 B2* | 6/2013 | Pudney | H04W 68/00 |
| | | | 455/458 |
| 8,462,742 B2* | 6/2013 | Song | H04W 12/062 |
| | | | 455/411 |
| 8,494,163 B2* | 7/2013 | Casati | H04L 63/0428 |
| | | | 380/270 |
| 8,544,077 B2 | 9/2013 | Sprunk et al. | |
| 8,570,956 B2 | 10/2013 | Park | |
| 8,699,711 B2 | 4/2014 | Mukherjee et al. | |
| 8,948,395 B2 | 2/2015 | Narayanan | |
| 2002/0066011 A1 | 5/2002 | Vialen et al. | |
| 2004/0044744 A1 | 3/2004 | Grosner et al. | |
| 2006/0227754 A1 | 10/2006 | Ko | |
| 2007/0011550 A1 | 1/2007 | Agrawal et al. | |
| 2007/0153793 A1 | 7/2007 | Jiang | |
| 2007/0171857 A1 | 7/2007 | Wang et al. | |
| 2007/0249352 A1* | 10/2007 | Song | H04L 63/08 |
| | | | 455/436 |
| 2007/0297367 A1 | 12/2007 | Wang et al. | |
| 2008/0010677 A1 | 1/2008 | Kashima et al. | |
| 2008/0043669 A1 | 2/2008 | Gallagher et al. | |
| 2008/0095368 A1 | 4/2008 | Iida et al. | |
| 2009/0067628 A1* | 3/2009 | Pudney | H04W 12/041 |
| | | | 380/255 |
| 2009/0221304 A1* | 9/2009 | Pudney | H04W 68/00 |
| | | | 455/458 |
| 2010/0048168 A1* | 2/2010 | Fox | H04W 48/12 |
| | | | 455/410 |
| 2010/0067697 A1* | 3/2010 | Casati | H04W 12/02 |
| | | | 380/278 |
| 2010/0235634 A1* | 9/2010 | Fischer | H04L 9/3247 |
| | | | 713/168 |
| 2010/0293372 A1* | 11/2010 | Fischer | H04W 12/06 |
| | | | 380/278 |

FOREIGN PATENT DOCUMENTS

| | | |
|---|---|---|
| EP | 1 97 3 265 | 9/2008 |
| RU | 97119182 A | 9/1999 |
| WO | WO 1996/033476 A2 | 10/1996 |
| WO | WO 01/24560 | 4/2001 |
| WO | WO 2001/024560 A1 | 4/2001 |
| WO | WO 2006/116620 A2 | 11/2006 |
| WO | 2007015066 A2 | 2/2007 |
| WO | WO 2007/022731 | 3/2007 |
| WO | WO 2008/024999 A2 | 2/2008 |
| WO | WO 2008/038949 A1 | 4/2008 |
| WO | 2009038522 A1 | 3/2009 |

OTHER PUBLICATIONS

3GPP TSG-SA WG3 #44 S3-060456 Jul. 11-14, 2006 Tallinn, Estonia.

3GPP TR 33.821 V0.1.0 (Feb. 2007) 3rd Generation Partnership Project; Technical Specification Group Services and System Aspects; Rationale and track of security decisions in Long Term Evolved (LTE) RAN / 3GPP System Architecture Evolution (SAE) (Release 8).

3GPP TS 33.abc V0.1.0 (Jul. 2007) 3rd Generation Partnership Project; Technical Specification Group Services and System Aspects; 3GPP System Architecture Evolution: Security Architecture; Release 8.

3GPP TR 33.821 V0.3.0 (May 2007) 3rd Generation Partnership Project; Technical Specification Group Services and System Aspects; Rationale and track of security decisions in Long Term Evolved (LTE) RAN 3GPP System Architecture Evolution (SAE) (Release 8).

3GPP TR 33.821 V0.8.0 (Apr. 2008) 3rd Generation Partnership Project; Technical Specification Group Services and System Aspects; Rationale and track of security decisions in Long Term Evolved (LTE) RAN / 3GPP System Architecture Evolution (SAE) (Release 8).

3GPP TS 33.abc V1.0.0 (Feb. 2008) 3rd Generation Partnership Project; Technical Specification Group Services and System Aspects; 3GPP System Architecture Evolution: Security Architecture; (Release 8).

3GPP TSG SA WG3 (Security) meeting #44 S3-060772 Agenda Item: 4.1 Tallin, Estonia, Jul. 11-14, 2006.

3GPP TSG SA WG3 #44 S3-030461 Jul. 11-14, 2006 Tallinn, Estonia.

3GPP TSG SA WG3 (Security meeting #45 S3-06xxx Draft Report of SA3 meeting #45; Ashburn USA Oct. 31-Nov. 3, 2006.

3GPP TSG SA WG3 (Security) meeting #46 S3-07xxx Draft Report of SA3 meeting #46; Beijing, PR China Feb. 13-16, 2007.

3GPP TSG SA WG3 Security—SA3#46 S3-070097 Beijing, China, Feb. 13-16, 2007.

3GPP TSG SA WG3 Security—SA3#46 S3-010100 Beijing China Feb. 13-16, 2007.

3GPP TSG SA WG3 Security—SA3#46b S3-070293 Sophia Antipolis France Mar. 28-29, 2007 SA3 ad hoc on SAE and security.

3GPP TSG SA WG3 Security—SA3#46b S3-070234 Sophia Antipolis Mar. 28-29, 2007.

3GPP TSG SA WG3 Security—SA3#46b S3-070272 Sophia Antipolis Mar. 28-29, 2007.

3GPP TSG SA WG3 Architecture—S2#47 Draft Report Apr. 23-27, 2007 Beijing China.

3GPP TSG SA Wg3 Security—SA3#47 S3-070302 Tallin Estonia May 22-25, 2007.

3GPP TSG SA WG3 Security—SA3#47 S3-070305 Tallin Estonia May 22-25, 2007.

(56) References Cited

OTHER PUBLICATIONS

3GPP TSG SA WG3 Security S3#47 S3-070368 May 22-25, 2007 Tallinn, Estonia.
3GPP TSG SA WG3 (Security) S3#48 Draft Report Montreal, Canada Jul. 10-13, 2007.
3GPP TSG SA WG3 Security S3#48 S3-070517 Jul. 10-13, 2007 Montreal Canada.
3GPP TSG SA WG3 Security S3#48 S3-070530 Jul. 10-13, 2007 Montreal Canada.
3GPP TSG SA WG3 Security S3#48 S3-070573 Jul. 10-13, 2007 Montreal Canada.
3GPP TSG SA WG3 Meeting #48 S3-070652 Jul. 10-13, 2007 Montreal Canada.
3GPP TSG SA WG3 Security S3#48 S3-070606 Jul. 10-13, 2007 Montreal Canada.
3GPP TSG SA WG3 Security S3#48 S3-070661 Jul. 10-13, 2007 Montreal Canada.
3GPP TSG SA WG3 (Security) S3#49 Draft Report Munich Germany Oct. 8-12, 2007.
3GPP TSG SA WG3 (Security) S3#49 S3-070675 Oct. 8-12, 2007 Munich Germany.
3GPP TSG SA WG3 Security SA3#49 S3-070750 Munich, Germany, Oct. 8-12, 2007.
3GPP TSG SA WG3 Security S3#49 S3-070698 Oct. 8-12, 2007 Munich, Germany.
3GPP TSG SA WG3 Security S3#49 S3-070803 Oct. 8-12, 2007 Munich, Germany.
3GPP TSG SA WG3 Security S3#49 S3-070764 Oct. 8-12, 2007 Munich, Germany.
3GPP TSG SA WG3 Security SA3#49 S3-070673 Oct. 8-12, 2007 Munich, Germany.
S3-070905 Idle Active agreed update Oct. 12, 2007.
3GPP TR 23,882 V1.8.0 (Feb. 2007) 3rd Generation Partnership Project; Technical Specification Group Services and System Aspects; 3GPP System Architecture Evolution: Report on Technical Options and Conclusions (Release 7).
3GPP, 3ra Generation Partnership Project; Technical Specification Group Services and System Aspects; GPRS Enhancements for E-UTRAN Access (Release 8). 3GPP TS 23.401 v1.0.0 (May 2007).
3GPP TR 33.821 V0.1.0 (Feb. 2007) 3rd Generation Partnership Project, Technical Specification Group Serivce and System Aspects; Rationale and trac of security Decitions in Long Term Evolved (LTE) RAN/3GPP system Architecture Evolution (SAE) (Release 8).
3GPP, Universal Mobile Telecommunications System (UMTS): Evolved Universal Terrestrial Radio Access (E-UTRA) and Evolved Universal Terrestrial Radio Access (E-UTRAN): Overall Description; Stage 2 (3GPP TS 36.300 version 8 1.0 Release 8) ETSI TS 136 300 v8.1.0. Jun. 2007.
Original Complaint, *Ericsson Inc.* v. *Apple, Inc.*, Civil Action No. 2: 15-cv-287 (E.D. Tex filed Feb. 26, 2015).
Original Complaint, *In the Matter of Certain Wireless Standard Compliant Electronic Devices, Including Communication Devices and Tablet Computers*, Inv. No. 337-TA-953 (USITC flied Feb. 26, 2015).
3GPP TS SA WG3 Security, S3-070524. Montreal, Canada. Jul. 10-13, 2007. Adding Content to Section 1-5 of TS33.abc (SAE: Security Architecture). SA3 Meeting #48. Jul. 2, 2007.
3GPP TS SA WG3 Security, S3-070525. Montreal, Canada. Jul. 10-13, 2007. Adding Content to Section 6 of TS33.abc (SAE: Security Architecture). SA3 Meeting #48. Jul. 2, 2007.
3GPP TS SA WG3 Security, S3-070526. Montreal, Canada. Jul. 10-13, 2007. Adding Content to Section 7 of TS33.abc (SAE: Security Architecture). SA3 Meeting #48. Jul. 2, 2007.
3GPP TS SA WG3 Security, S3-070555. Montreal, Canada. Jul. 10-13, 2007. Ericsson, use of Node Identities in Key Derivations. SA3 Meeting #47. Jul. 3, 2007.
3GPP TSG SA WG3 Security, S3-06xxxx, Documentation of LTE Security Design, SA3 Meeting #42, Ericsson. Bangalore, India, Feb. 6-9, 2006.

3GPP TSG SA WG3 Security, S3-060236, Apr. 4-7, 2006. Athens, Greece. Key Management for LTE RRC. SA3 meeting #43 Mar. 27, 2006.
3GPP TSG SA WG3 #44, S3-060961, Considerations on Security Architecture for SA/LTE. Tallinn, Estonia. Jul. 11-14, 2006.
3GPP TS SA WG3 Security, S3-070280 v.1. Draft1 Reply to "LS Verification of Security Principles". Apr. 10, 2007.
3GPP TS SA WG3 Security, S3-070280 v.2. Draft1 Reply to "LS Verification of Security Principles". Apr. 18, 2007.
3GPP TS SA WG3 Security, S3-070280 Final. Apr. 23, 2007.
3GPP TSG SA WG3 Security, S3-07xxxx, SA3 Meeting #47, Key Derivations at eNB to eNB handover. May 2, 2007.
3GPP TSG SA WG3 Security, S3-070478, TR 33821 v0.3.0. $3^{rd}$ Generation Partnership Project, Technical Specification Group Services and System Aspects, Rationale and Track of Security Decisions in Long Term Evolved (LTE) RAN / 3GPP System Architecture Evolution (SAE) (Release 8) Jun. 1, 2007.
3GPP TSG SA WG3 Security, S3-070479, 33.abc v0.0.0. $3^{rd}$ Generation Partnership Project, Technical Specification Group Services and System Aspects, 3GPP System Architecture Evolution Security Architecture (Release 8) May 24, 2007.
3GPP TSG SA WG3 Security, Draft S3-070624 v.1 update Jul. 2007. $3^{rd}$ Generation Partnership Project, Technical Specification Group Services and System Aspects, 3GPP System Architecture Evolution Security Architecture (Release 8) Jul. 11, 2007.
3GPP TSG SA WG3 Security, Draft S3-070624 33.abc v.0.1.0. $3^{rd}$ Generation Partnership Project, Technical Specification Group Services and System Aspects, 3GPP System Architecture Evolution Security Architecture (Release 8) Jul. 11, 2007.
3GPP TSG SA WG3 Security, S3-070729, E-UTRAN Cryptographic Algorithm Input and Output. SA3 Meeting #49, Munich Germany. Oct. 8-12, 2007.
3GPP TSG SA WG3 Security, S3-070769. Decision Proposals (TS 33.abc, TR 33.821) S3 Meeting #49. Munich Germany. Oct. 8-12, 2007.
3GPP TSG SA WG3 Security, S3-070770. Decision Proposals for TS 33.abc pCR. Meeting #49. Munich Germany. Oct. 8-12, 2007.
3GPP TSG SA WG3 Security, S3-070771. TS 33.abc Updates from TR 33.821 and 33.102 Adapted to LTE Terminology and Security Architecture. S3 Meeting #49. Munich Germany. Oct. 8-12, 2007.
3GPP TSG SA WG3 Security, S3-070776. TS 33.abc Updates from TS 33.102 and TR 33.821 pCR. Meeting #49. Munich Germany, Oct. 8-12, 2007.
S3-070230, Pseudo-Change Request to TR 33.821: Update of section 7.4.7 on Hierarchy of user-related keys in SAE/LTE, Nokia, Siemens Networks, 3GPP TSG WG3 #46bis, Mar. 28-29, 2007.
S3-070240, Key change during LTE_ACTIVE, Nokia, Siemens Networks, 3GPP TSG WG3 #46bis, Mar. 28-29, 2007. Mar. 21, 2007.
S3-070303, Key derivations at eNB to eNB handover, Ericsson, 3GPP TSG WG3 #47, May 22-25, 2007. May 2, 2007.
S3-070304, Key handling on idle mode mobility, Nokia Siemens Networks, Nokia, 3GPP TSG WG3 #47. May 22-25, 2007. May 2, 2007.
S3-070625, 3GPP TR 33.821v.0.4.0 (Jul. 2007). Jul. 14, 2007.
3GPP TS 36.300 v. 8.1.0 (Jun. 2007), 3rd Generation Partnership Project; Technical Specification Group Radio Access Network; Evolved Universal Terrestrial Radio Access (EUTRA) and Evolved Universal Terrestrial Radio Access Network (E-UTRAN); Overall description; Stage 2 (Release 8). Jun. 2007.
3GPP TR 33.821 v.0.4.0; $3^{rd}$ Generation Partnership Project; Technical Specification Group Services and System Aspects; Rationale and track fo security decisions in Long Term Evolved (LTE) RAN/3GPP System Architecture Evolution (SAE) (Release 8). Jun. 2007.
3GPP TR 23.401 v.1.2.1; $3^{rd}$ Generation Partnership Project; Technical Specification Group Services and System Aspects; GPRS enhancements for EUTRAN access (Release 8). Sep. 12, 2007.
S3-070674, IDLE to ACTIVE mode key management, Ericsson, 3GPP TSG WG3 #49, Oct. 8-12, 2007. Sep. 29 2007.

(56) References Cited

OTHER PUBLICATIONS

S3-070762, Ericsson Comments on Uniform key refreshment procedure in attach procedure, service request procedure, Idle mode mobility and handover, Ericsson, 3GPP TSG WG3 #49, Oct. 8-12, 2007. Oct. 2, 2007.
Sun Microsystems, Inc. Simple Key-Management for Internet Protocols. Oct. 16, 1995.
Daydreamer. Photuris: Session-Key Management Protocol. Mar. 1999. Baugher.
The Secure Real-time Transport Protocol (SRTP). RFC 3711. Mar. 2004.
Ericsson Research. MIKEY: Multimedia Internet KEYIng. Aug. 2004.
Journal of Cryptology, Instant Ciphertext-Only Cryptanalysis of GSM encrypted Communication. vol. 21 Issue 3, Mar. 2008.
Kaufman et al. Network Security: Private Communication in a Public World. May 2, 2002.
Viega et al. Secure Programming Cookbook for C and C++. Jul. 21, 2003.
Horowitz. Key Derivation for Authentication, Integrity, and Privacy, Network Working Group (draft-horowitz-key-derivation- 02.txt) ("Horowitz"). Aug. 1998.
Niemi, V. et al. UMTS Security (John Wiley & Sons) 2003.
Sans Institute The GSM Standard (An overview of its security) (available at http://www.sans.org/readingroom/whitepapers/telephone/gsmstandard-an-overview-sectirity-317). 200.
Menezes, et al. Handbook of Applied Cryptography (CRC Press) 1997.
Schneier. Applied Cryptography (John Wiley & Sons 2nd ed.) 1996.
Sans Institute. SSL and TLS: A Beginners Guide (http://www.sans.org/readingroorn/whitepapers/protocols/ssltis-beginners-guide-1029) 2003.
Preneel, et al. State of the Art in Applied Cryptography (Springer) 1998.
Longley, et al. Information Security: Dictionary of Concepts, Standards and Terms (Stockton Press) 1992.
3GPP. 3GPP TS ab.cde v0.3.0 (Sep. 2003), 3rd Generation Partnership Project; Technical Specification Group Services and System Aspects; Bootstrapping of application security using AKA and Support for Subscriber Certificates; System Description (Release 6) No later than Sep. 2003.
Krawczyk. SKEME: A Versatile Secure Key Exchange Mechanism for Internet, IEEE Computer Society Feb. 22-23, 1996.
3rd Generation Partnership Project; Technical Specification Group Services and System Aspects; 3G Security; Security Architecture (3G TS 33.102 version 3,1,0). 3G TS 33.102 V3.1.0 (Jul. 1999).
Terrestrial Trunked Radio (TETRA); Voice plus Data (V+D); Part 7: Security. ETSI EN 300 392-7 V2.1.1 (Feb. 2001).
Digital cellular telecommunications system (Phase 2+); Security related network functions (GSM 03.20 version 8.1.0 Release 1999) ETSI TS 100 929 v8.1.0. Jul. 2001).
Ylonen, T. et al. SSH Transport Layer Protocol. Network Working Group, IETF. Sep. 20, 2002.
Dierks. et al, The TLS Protocol Network Working Group. Request for Comments: 2246 Jan. 1999.
3rd Generation Partnership Project; Technical Specification Group Services and System Aspects; Generic Authentication Architecture (GAA); Access to network application functions using Hypertext Transfer Protocol over Transport Layer Security (HTTPS) (Release 6). 3GPP TS 33.222 V6.0.0 (May 2004).
3rd Generation Partnership Project; Technical Specification Group Services and System Aspects; 3G Security; Access security for IP-based services (Release 6). 3GPP TS 33.203 V6.0.0 (Sep. 2003).
3GPP TSG SA WG3 Security, S3-070100. SA3#46. Beijing China, Feb. 13-16, 2007.
3GPP TSG SA WG3 Security, S3-070731. SA3#49. Munich, Germany, Oct. 8-12, 2007.

Defendant Apple Inc.'s P.R. 3-3 Invalidity Contentions, *Ericsson Inc.* v. *Apple, Inc.*, Civil Action No. 2: 15-cv-287 (E.D. Tex filed Jul. 20, 2015).
Exhibit B-I to Defendant Apple Inc.'s P.R. 3-3 Invalidity Contentions, *Ericsson Inc.* v. *Apple, Inc.*, Civil Action No. 2: 15-cv-287 (E.D. Tex filed Jul. 20, 2015).
Exhibit B-2 to Defendant Apple Inc.'s P.R. 3-3 Invalidity Contentions, *Ericsson Inc.* v. *Apple, Inc.*, Civil Action No. 2: 15-cv-287 (E.D. Tex filed Jul. 20, 2015).
Exhibit B-3 to Defendant Apple Inc.'s P.R. 3-3 Invalidity Contentions, *Ericsson Inc.* v. *Apple, Inc.*, Civil Action No. 2: 15-cv-287 (E.D. Tex filed Jul. 20, 2015).
Exhibit B-4 to Defendant Apple Inc.'s P.R. 3-3 Invalidity Contentions, *Ericsson Inc.* v. *Apple, Inc.*, Civil Action No. 2: 15-cv-287 (E.D. Tex filed Jul. 20, 2016).
Ground of Invalidity. HP-205-000023. In the high Court of Justice, Chancery Division, Patents Court. Aug. 14, 2015.
S3-070161. 3GPP TR33.821 v0.1.0 "Rationale and track of security decisions in Long Term Evolved RAN/3GPP System Architecture Evolution" (Nokia), 3GPP TSG SA WG3 Security S3#47, Feb. 13-16, 2007.
Super 3G Technology Trends Pad 2: Research on Super 3G Technology. NTT DoCoMo Technical Journal. Dec. 2006.
Lehtovirta, V. Email dated Sep. 17, 2007.
3rd Generation Partnership Project; Technical Specification Group Services and System Aspects; Generic Authentication Architecture (GAA); Generic bootstrapping architecture (Release 8). 3GPP TS 33.220 V8.0.0 (Jun. 2007).
Kelly, et al. Using HMAC-SHA-256, HMAC-SHA-384, and HMAC-SHA-512 with IPsec. Network Working Group. Request for Comments: 4868. Category: Standards Track. May 2007.
3rd Generation Partnership Project; Technical Specification Group Core Network and Terminals; Non-Access-Stratum (NAS) protocol for Evolved Packet System (EPS); Stage 3 (Release 8) 3GPP TS 24.301 V2.0.0 (Nov. 2008).
Ericsson. Documentation of LTE Security Design. 3GPP TSG SA3 Meeting #42, S3-060117. Bangalore, India, Feb. 6-9, 2006.
3rd Generation Partnership Project; Technical Specification Group Services and System Aspects; GPRS enhancements for E-UTRAN access (Release 8). 3GPP TS 23.401 V1.0.0 (May 2007).
3rd Generation Partnership Project; Technical Specification Group Services and System Aspects; GPRS enhancements for E-UTRAN access (Release 8). 3GPP TS 23.401 V1.1.0 (Jul. 2007).
Notice of Opposition to a European Patent. EP Application 08767152. 5. Aug. 25, 2016.
3GPP TSG SA WG2 Meeting #59, Aug. 27-31, 2007 Helsinki, Finland,"Response to LS on Service Request for SAE/L TE" Release 8, TD S2-073899.
3GPP TSG SA WG3 meeting #45 ,Ashburn, VA, USA, Oct. 31-Nov. 3, 2006, "Reply LS on assumptions for security procedures" S3-060833.
International Standard, "Information technology—Security techniques—Key management—Part 2: Mechanisms using symmetric techniques", International Organization for Standardization, ISO/IEC 11770-2, Apr. 15, 1996, First Edition.
3GPP TS 23.401 V1.1.0, 3GPP, "3rd Generation Partnership Project; Technical Specification Group Services and System Aspects; GPRS enhancements for E-UTRAN access (Release 8)", TS 23.401 V1.1.0, Jul. 2007.
Abeta et al., "Super 3G Technology Trends Part2: Research on Super 3G Technology", NTT DoComo Technical Journal, 2006, vol. 8, No. 3.
Ericsson, "KeNB derivation at Inter-RAT handover to E-UTRAN", 3GPP TSG-RAN WG2 #61-bis, Tdoc R2-081493, Mar. 31-Apr. 4, 2008, Shenzhen, PRC.
LG Electronics, "Considerations on Security Architecture for SAE/LTE", 3GPP TSG SA WG3 #44, S3-060461, Jul. 11-14, 2006, Tallinn, Estonia.
Nokia et al., "Security algorithm negotiation in SAE/LTE networks", ¬3GPP TSG SA WG3 Security SA3#46, S3-070100, Feb. 13-16, 2007, Beijing, China.

\* cited by examiner

METHOD AND ARRANGEMENT IN A TELECOMMUNICATION SYSTEM

RELATED APPLICATIONS

This application is a continuation of U.S. patent application Ser. No. 16/565,796 filed on Sep. 10, 2019, which is a continuation of U.S. patent application Ser. No. 16/043,596, now U.S. Pat. No. 10,455,417, filed on Jul. 24, 2018, which is a continuation of U.S. patent application Ser. No. 15/443,229 filed on Feb. 27, 2017, now U.S. Pat. No. 10,057,055, which is a continuation of U.S. patent application Ser. No. 14/568,329 filed on Dec. 12, 2014, now U.S. Pat. No. 9,615,249, which is a continuation of U.S. patent application Ser. No. 14/151,077 filed Jan. 9, 2014, now U.S. Pat. No. 8,938,076, which is a continuation of U.S. Ser. No. 12/677,675 filed Jul. 9, 2010, now U.S. Pat. No. 8,660,270, which is a 371 of International Application No. PCT/SE2008/050591, filed May 20, 2008, which claims benefit of U.S. Provisional Application No. 60/972,955, filed Sep. 17, 2007, the disclosures of which are fully incorporated herein by reference.

TECHNICAL FIELD

The present invention relates to methods and arrangements in a telecommunication system, and in particular to a security solution in the EPS (Evolved Packet System), i.e. the E-UTRAN (the Evolved UMTS Terrestrial Radio Access Network) and the EPC (Evolved Packet Core network), for UE-triggered service requests. More specifically, the present invention relates a method and an arrangement in an MME (Mobility Management Entity) and in a UE (User Equipment) for an EPS (Evolved Packet System) of establishing a security key for protecting RRC/UP traffic.

BACKGROUND

In the EPS-architecture, the subscriber authentication is performed between a UE and an MME (Mobility Management Entity), and the MME manages e.g. the mobility, the UE-identities and the security parameters. The basis for defining the security procedure in the EPS is a security key, K_ASME, which is shared between the MME and the UE, and established at the authentication of the UE. A functional entity of the EPS-architecture called the ASME (Access Security Management Entity) may e.g. be co-located with the MME, and the ASME receives and stores the security key K_ASME derived from the CK/IK-keys confined in the home network. From the security key, K_ASME, the ASME derives an NAS security context used to protect the NAS signalling, i.e. the Non Access Stratum signalling between the MME of the Evolved Packet Core (EPC) network and a UE. The NAS security context contains parameters for the encryption and integrity protection of the NAS signalling, such as K_NAS_enc, K_NAS_int, as well as uplink and downlink sequence numbers, NAS_U_SEQ and NAS_D_SEQ, and the sequence numbers are used to prevent replay of old messages, as well as for input to the encryption and integrity protection procedures. The ASME provides the MME with the NAS security context, and one NAS security context is kept in the MME, and a corresponding NAS security context is kept in the UE, and the replay protection, integrity protection and encryption are based on that the sequence numbers of the NAS security contexts of the MME and UE are not reused.

Preferably, the security context for the protection of the UP/RRC traffic between a UE and the serving eNodeB (i.e. a radio base station in an EPS-architecture) is also based on said security key, K_ASME. The procedure to establish the UP/RRC security context involves deriving a key called K_eNB, from which the encryption key K_eNB_UP_enc is derived for protecting the UP (User Plane), i.e. the end user data transferred over EPC and E-UTRAN, as well as the encryption key, K_eNB_RRC_enc, and the integrity protection key, K_eNB_RRC_int, for protecting the RRC (Radio Resource Control).

FIG. 1 illustrates a conventional exemplary signalling flow for a UE-initiated IDLE to ACTIVE state transition in an EPS-architecture. An IDLE UE is only known to the EPC (Evolved Packet Core) of the EPS, and no UP/RRC security context exists between the eNodeB and the UE. An UE in the ACTIVE state is known both in the EPC and in the EUTRAN, and a UP/RRC security context has been established for protection of the UP/RRC-traffic between the UE and its serving eNobeB.

FIG. 1 illustrates a UE 11, an eNodeB 12, an MME 13, a serving GW (Gateway) 14, a PDN Gateway 15, and the HSS (Home Subscriber Server) 16. The Serving Gateway 14 is the node of the EPC that terminates the interface towards EUTRAN, and the PDN Gateway is the node of the EPC that terminates the interface towards a PDN (Packet Data Network). If a UE accesses multiple PDNs, there may be multiple PDN Gateways for that UE. In signal S1 and signal S2, the NAS Service Request is transparently forwarded from the UE to the MME, and the NAS Service Request is integrity protected based on NAS_U_SEQ. In the optional signal S3, the UE is authenticated by the MME and the K_ASME is established, using subscriber data stored in the HSS (Home Subscriber Server), and the MME sends the Initial Context Setup Request to the eNodeB, in S4. In the signals S5 and S6, the eNodeB establishes the radio bearer with the UE and forwards uplink data, and returns an Initial Context Setup Complete-message to the MME in signal S7. In signal S8, the MME sends an update bearer request to the Serving GW, and the serving GW responds in signal S9.

In prior solutions, the derivation of the K_eNB by the UE and MME for the RRC/UP security context is based e.g. on a NAS SERVICE ACCEPT message or other explicit information sent from the MME to the UE. However, as illustrated in the exemplary conventional EPS signalling flow in FIG. 1, the MME will normally not send any NAS SERVICE ACCEPT upon receiving a NAS SERVICE REQUEST from a UE in an EPS. Therefore, it will not be possible to derive the K_eNB from the information in a NAS SERVICE ACCEPT message.

According to an exemplary known solution, the K_eNB is derived by the MME from the K_ASME and the NAS_D_SEQ used by the MME in the NAS SERVICE ACCEPT message, and the UE derives the same K_eNB by retrieving the sequence number, NAS_D_SEQ, from the NAS SERVICE ACCEPT message and performing the same K_eNB derivation as the MME. The MME transfers the K_eNB to the eNodeB when it sets up the S1-connenction to the eNodeB. However, a drawback with this known solution is that if no explicit NAS SERVICE ACCEPT message is defined from the MME to the UE, as in the exemplary conventional EPS signalling flow in FIG. 1, it is not possible for the UE to derive the same K_eNB as the MME. Even though it is technically possible for the UE to estimate a current NAS downlink sequence number, NAS_D_SEQ, this estimation could be erroneous, since the MME may have sent NAS messages that were lost and never received by the UE. In such a case, the MME would have updated its NAS_D_SEQ, without the UE being aware of the updating, leading to an erroneous NAS_D_SEQ in the UE.

According to another exemplary known solution, the derivation of the K_eNB is based on a separate sequence number maintained specifically for the derivation of the K_eNB, and this sequence number is explicitly synchronized during the NAS Service Request procedure either by the UE sending it to the MME, or by the MME sending it to the UE.

However, a drawback with this solution is the extra complexity of the separate sequence number, since it has to be maintained both in the UE and in the MME in order to prevent replay attacks.

SUMMARY

The object of the present invention is to address the problem outlined above, and this object and others are achieved by the method and arrangement according to the independent claims, and by the embodiments according to the dependent claims The basic idea of the present invention is that the K_eNB is derived from the K_ASME and from the NAS_U_SEQ of the NAS SERVICE REQUEST message from the UE to the MME, thereby triggering the establishment of a UP/RRC security context in the eNodeB.

It is an advantage of the present invention that no explicit downlink NAS SERVICE ACCEPT message or sequence number from the MME to the UE is required, and that the replay protection functionality of the NAS security context is re-used in the RRC and UP security contexts.

According to one aspect, the invention provides a method in a Mobility Management Entity, MME, of an Evolved Packet System, EPS, of establishing a security key, K_eNB, for protecting RRC/UP traffic between a User Equipment, UE, and an eNodeB serving the UE. The method comprises the steps of receiving an NAS Service Request from the UE, the request indicating a NAS uplink sequence number, NAS_U_SEQ; Deriving the security key, K_eNB, from at least said received NAS_U_SEQ and from a stored Access Security Management Entity-key, K_ASME, shared with said UE; and forwarding said derived K_eNB to the eNodeB serving said UE.

According to a second aspect, the invention provides a Mobility Management Entity, MME, for an Evolved Packet System, EPS. The MME is arranged to establish a security key, K_eNB, for protection of RRC/UP-traffic between a UE and an eNodeB serving the UE. The MME comprises means for receiving an NAS Service Request from the UE, the request indicating a NAS uplink sequence number, NAS_U_SEQ; Means for deriving a K_eNB from at least said received NAS_U_SEQ and from a stored Access Security Management Entity-key, K_ASME, shared with said UE, as well as means for sending said derived K_eNB to the eNodeB serving said UE.

The first and the second aspect further provides methods, as well as corresponding means, according to which the MME may derive the K_eNB from the NAS_U_SEQ and the K_ASME using a Pseudo-Random Function, PRF. The MME may further reconstruct the full NAS uplink sequence number NAS_U_SEQ from received low order bits and integrity check the NAS Service Request received from the UE. Additionally, the MME may return an indication of the received NAS_U_SEQ to the UE, and the NAS_U_SEQ may be included in the set-up message forwarding the K_eNB to the eNodeB. Thereby, the UE does not have to remember the NAS_U_SEQ sent to the MME.

According to a third aspect, the invention provides a method in a User Equipment, UE, of an Evolved Packet System, EPS, of establishing a security key, K_eNB, for protecting RRC/UP traffic exchanged with a serving eNodeB. The method comprises the steps of sending an NAS Service Request to a Mobility Management Entity, MME, the request indicating a NAS uplink sequence number, NAS_U_SEQ; and deriving the K_eNB from at least said NAS_U_SEQ and from a stored Access Security Management Entity-key, K_ASME, shared with said MME.

According to a fourth aspect, the invention provides a User Equipment, UE, adapted for an Evolved Packet System, EPS. The UE is arranged to establish a security key, K_eNB, for protecting RRC/UP-traffic exchanged with a serving eNodeB. The UE comprises means for sending a NAS Service Request to an MME, the request indicating a NAS uplink sequence number, NAS_U_SEQ, as well as means for deriving a K_eNB from at least said NAS_U_SEQ, and from a stored Access Security Management Entity-key, K_ASME, shared with said MME.

The third and the fourth aspect further provides methods, as well as corresponding means, according to which the UE may derive the K_eNB from the NAS_U_SEQ and the K_ASME using a Pseudo-Random Function, PRF, and integrity protect the NAS Service Request sent to the MME. Additionally, the UE may store the NAS_U_SEQ of the NAS Service Request sent to the MME, or, alternatively, receive an indication of the NAS_U_SEQ of the NAS Service Request sent to the MME, back from the MME via the eNodeB. This alternative embodiment has the advantage that the UE does not have to remember the NAS_U_SEQ sent to the MME. The UE may further derive the K_eNB from the NAS_U_SEQ and the K_ASME after the reception of a security configuration message from the eNodeB.

BRIEF DESCRIPTION OF THE DRAWINGS

The present invention will now be described in more detail, and with reference to the accompanying drawings, in which.

DETAILED DESCRIPTION

In the following description, specific details are set forth, such as a particular architecture and sequences of steps in order to provide a thorough understanding of the present invention. However, it is apparent to a person skilled in the art that the present invention may be practised in other embodiments that may depart from these specific details.

Moreover, it is apparent that the described functions may be implemented using software functioning in conjunction with a programmed microprocessor or a general purpose computer, and/or using an application-specific integrated circuit. Where the invention is described in the form of a method, the invention may also be embodied in a computer program product, as well as in a system comprising a computer processor and a memory, wherein the memory is encoded with one or more programs that may perform the described functions.

The concept or the invention is that the security key, K_eNB, is derived from the Access Security Management Entity-key, K_ASME, and from the uplink sequence counter, NAS_U_SEQ, of the NAS SERVICE REQUEST message sent from the UE to the MME, thereby triggering the establishment of the UP/RRC security context in the eNodeB.

When the UE is in IDLE mode, a NAS security context exists and comprises e.g. the above described K_NAS_enc, K_NAS_int, NAS_U_SEQ and NAS_D_SEQ, and the NAS messages are integrity- and possibly confidentiality protected. The NAS security context thus also contains the security capabilities of the UE, in particular the encryption and integrity algorithms.

The protection of the NAS messages is based on the NAS security keys, K_NAS_enc, K_NAS_int, and the uplink and downlink sequence counters, NAS_U_SEQ or NAS_D_SEQ, for the direction of the message. The full sequence counter is normally not transmitted with the NAS message, only some of the low order bits, and the full sequence number will be reconstructed at the receiving end from a local estimate of the high order bits and the received low order bits.

Figure 1:
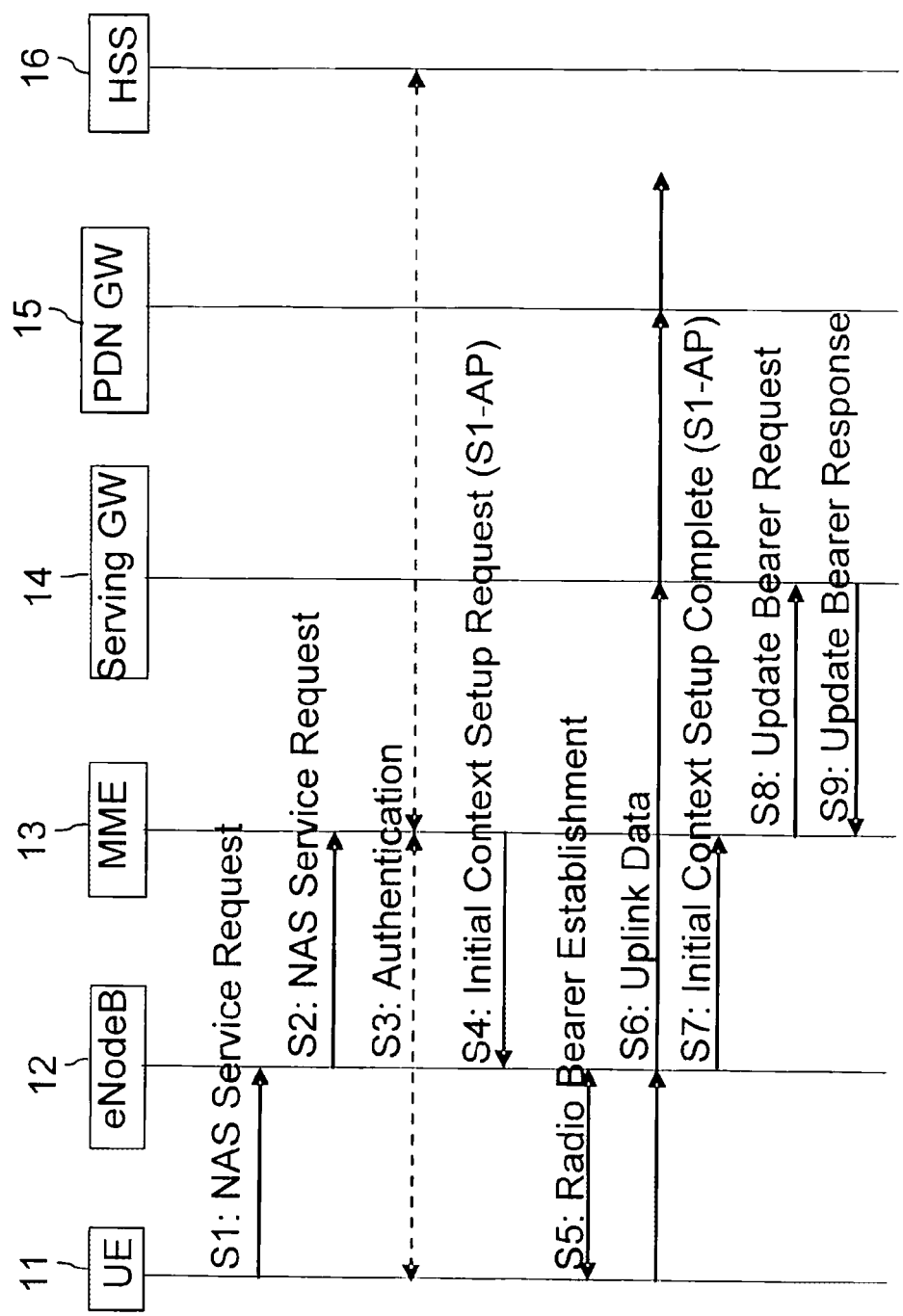
FIG. 1 is signalling diagram illustrating a conventional UE triggered Service Request in an EPS.

The concept of the invention may be explained in the context of the signalling diagram for UE-triggered service requests, as depicted in the above-described FIG. 1:

In S1 and S2 of the conventional signalling diagram in FIG. 1, a NAS SERVICE REQUEST, comprising an uplink sequence counter, NAS_U_SEQ, is forwarded from the UE to the MME, and the NAS SERVICE REQUEST-message is integrity protected based on said NAS_U_SEQ. The MME checks the integrity of the message and accepts it if it is not a replay, and this guarantees that the NAS_U_SEQ is fresh and has not been used before.

Thereafter, according to this invention, the MME derives the K_eNB based at least on the received uplink sequence counter NAS_U_SEQ and on the K_ASME, using a conventional key derivation function, and this is not included in the conventional signalling diagram illustrated en FIG. 1. Consequently, the sequence counter may only be reset at the authentication. The MME will send the derived K_eNB down to the eNodeB in, or piggybacked to, the message of the signal S4, the Initial Context Setup Request (S1-AP).

In signal S5, the eNodeB sends a Radio Bearer Establishment and a security configuration message (Security Mode Command) to the UE. These messages may be sent as two separate messages or combined in one message, as in FIG. 1, and the reception of these messages by the UE will implicitly be a confirmation of the UEs NAS SERVICE REQUEST, in signal S1. The Security Mode Command will determine e.g. when the protection should start and which algorithm to use.

According to this invention, the UE derives the K_eNB based at least on the NAS_U_SEQ and the K_ASME, using a conventional key derivation function, upon reception of the message in signal S5, if not performed before. Thereafter, the eNodeB and the UE will establish the UP/RRC security contexts, and this is not illustrated in the conventional signalling diagram in FIG. 1.

According to a first embodiment of this invention, the UE stores the uplink sequence counter, NAS_U_SEQ, included in the initial NAS SERVICE REQUEST in signal S1, and uses the stored NAS_U_SEQ for the derivation of the K_eNB.

However, according to a second embodiment, the MME includes the uplink sequence counter, NAS_U_SEQ, or only low order bits indicating the NAS_U_SEQ, in the S1-AP set-up message, in signal S4, sent to the eNodeB, in which case this information is also forwarded to the UE from the eNodeB during the RRC/UP context establishment. In this case, the UE will be able to retrieve the indication of the NAS_U_SEQ from the eNodeB for the derivation of the K_eNB, and does not have to keep the NAS_U_SEQ of the NAS NAS SERVICE REQUEST-message sent to the MME in the signals S1 and S2.

Figure 2:
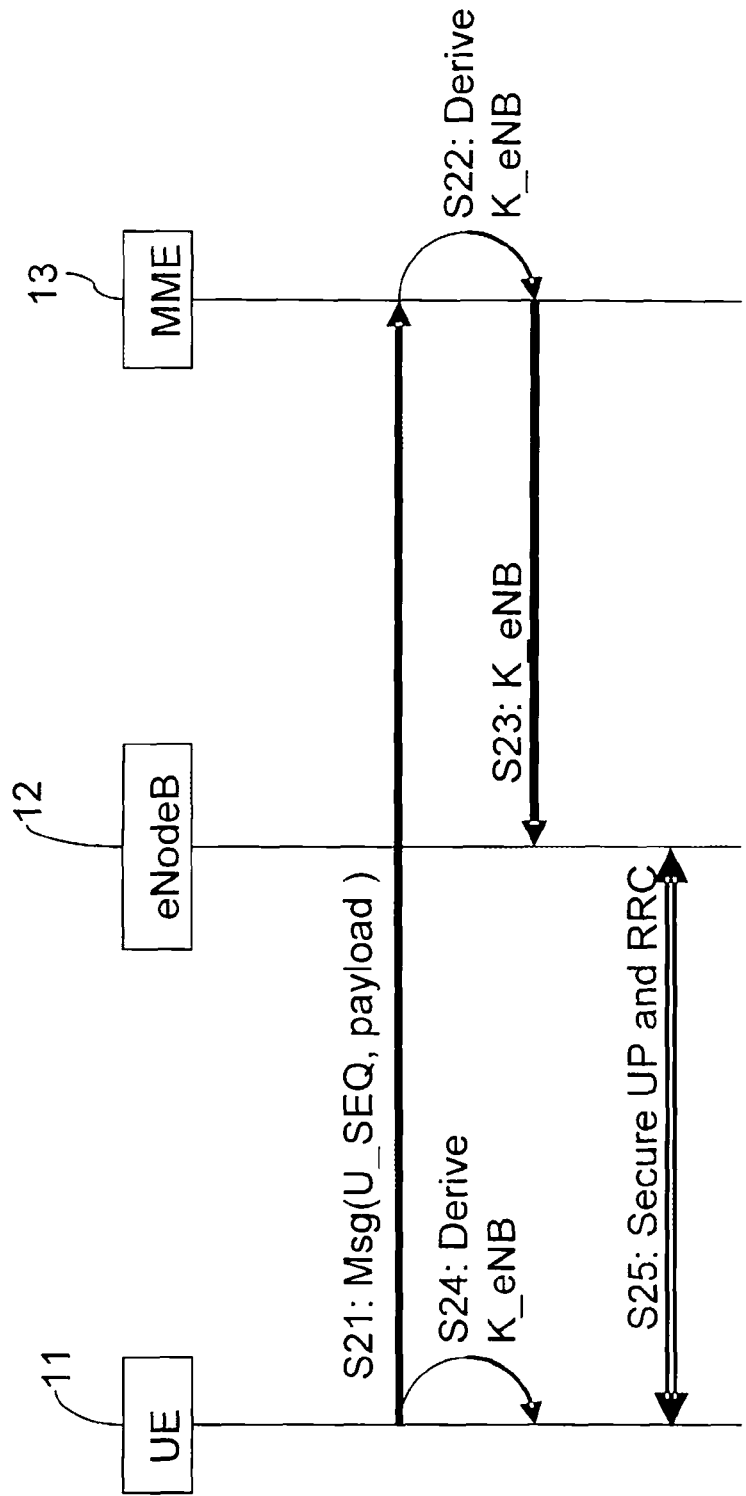
FIG. 2 is a signalling diagram illustrating the first embodiment of this invention, according to which the UE remembers the NAS_U_SEQ sent to the MME in an NAS SERVICE REQUEST-message.

FIG. 2 illustrates the first embodiment of this invention, in which the UE keeps the NAS_U_SEQ of the initial NAS SERVICE REQUEST-message, in the signal S21, for the derivation of K_eNB in the signal S24. The MME will receive the NAS_U_SEQ from the UE in the signal S21, or only low order bits indicating the NAS_U_SEQ, and derive the K_eNB based on the NAS_U_SEQ and the K_ASME in S22. The MME forwards the derived K_eNB to the eNodeB in the signal S23.

Thereafter, not illustrated in FIG. 2, the eNodeB and the UE will establish the UP/RRC security context using the K_eNB, the UP/RRC security contexts comprising the encryption key, K_eNB_UP_enc for protecting the UP-traffic, as well as the encryption key and the integrity protection key, K_eNB_RRC_enc and K_eNB_RRC_int, respectively, for protecting the RRC-traffic, thereby enabling a secure UP/RRC traffic, in signal S25.

The derivation of the K_eNB is performed by a conventional key derivation function, e.g. by a Pseudo-Random Function; K_eNB=PRF(K_ASME, NAS_U_SEQ, . . . ).

Further, as illustrated by the dots in the above-described PRF-function, the K_eNB-deriving function may have additional conventional input values, such as e.g. the eNodeB-identity.

Figure 3:
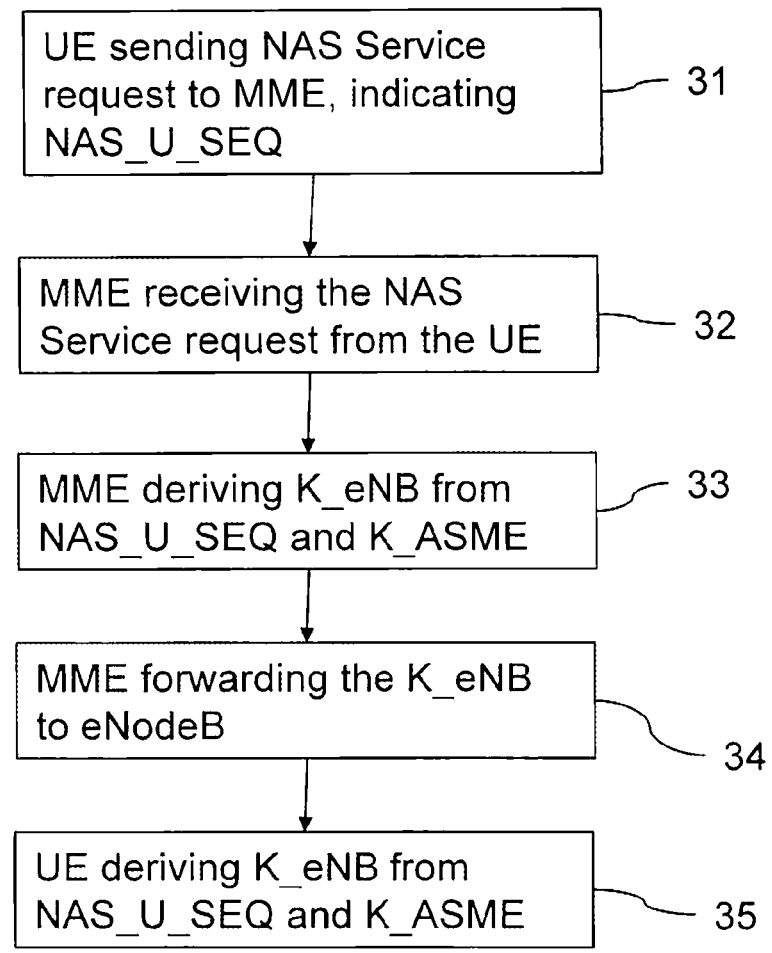
FIG. 3 is a flow diagram illustrating the derivation of the K_eNB by the UE and the MME.

FIG. 3 is a flow diagram illustrating the method according to this invention, and in step 31, the UE 11 sends the initial NAS SERVICE REQUEST-message to the MME 13, the message indicating the NAS uplink sequence counter, NAS_U_SEQ, normally only by sending the low order bits of the counter. In step 32, the MME receives the NAS SERVICE REQUEST-message from the UE, obtaining the NAS_U_SEQ, and reconstructing the full sequence from the received low order bits. In step 33, the MME derives the security key, K_eNB, from at least the received NAS_U_SEQ and the K_ASME from the ASME (Access Security Mobility Entity), using a suitable key derivation function, e.g. a Pseudo-Random Function.

Thereafter, the MME forwards the derived K_eNB to the eNodeB 12, in step 34, to be used by the eNodeB to establish the complete UP/RRC security context shared with the UE. In step 35, said UE will derive the same K_eNB from at least the stored K_ASME and from the NAS_U_SEQ of the initial NAS SERVICE REQUEST-message transmitted from the UE to the MME in step 31, and establish the UP/RRC security context from the derived K_eNB.

In the first embodiment of this invention, the UE stores the NAS_U_SEQ transmitted to the MME in the initial NAS NAS SERVICE REQUEST-message, and uses the stored sequence number to derive the K_eNB.

Figure 4:
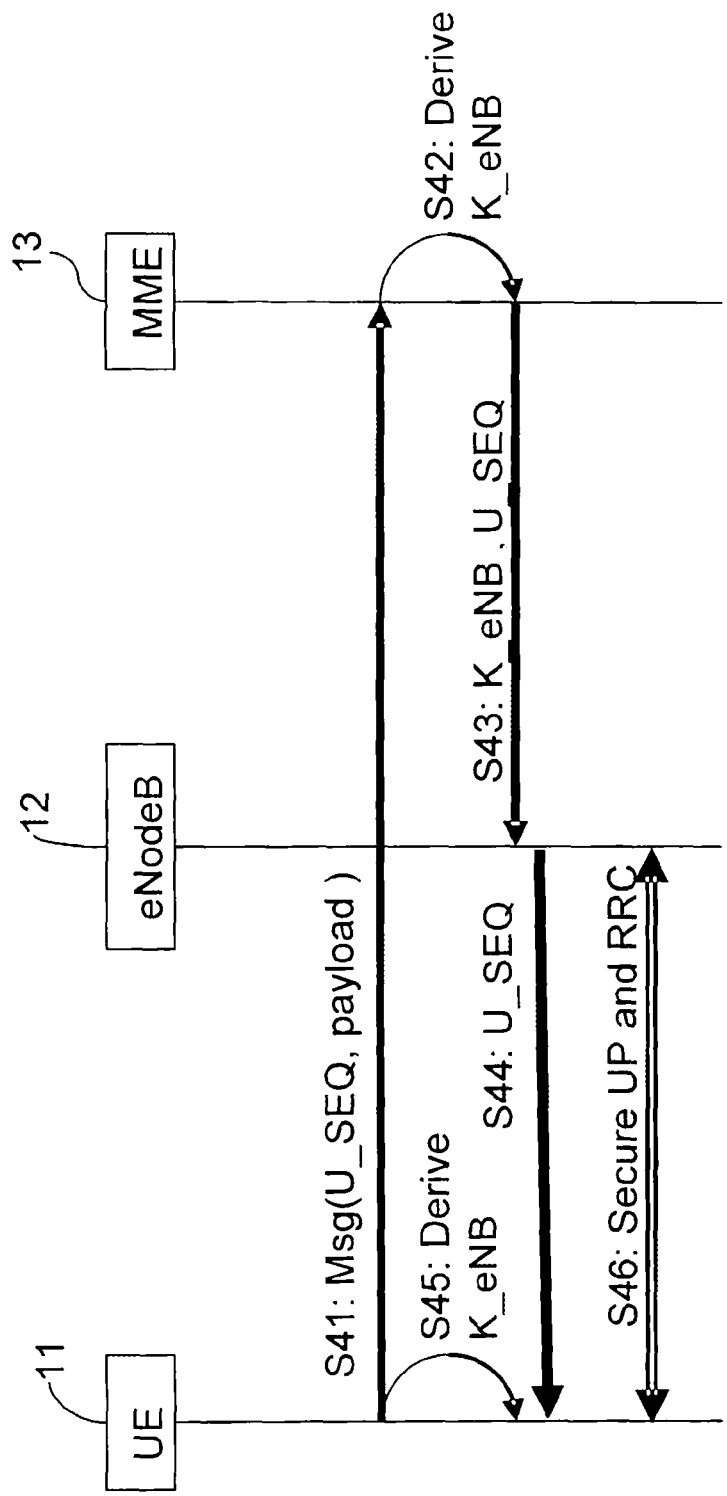
FIG. 4 is a signalling diagram illustrating a second embodiment of this invention, in which the MME returns the received NAS_U_SEQ to the UE.

FIG. 4 is a signalling diagram illustrating a second embodiment of this invention, in which the UE does not have to store the NAS_U_SEQ. Instead, the MME will return an indication of the received NAS_U_SEQ back to the UE, via the eNodeB. In signal S41, corresponding to the signal S21 in FIG. 2, the UE 11 transmits an initial NAS SERVICE REQUEST to the MME 13, indicating an uplink sequence number, NAS_U_SEQ, and MME will receive the NAS_U_SEQ and derive the K_eNB based on at least the NAS_U_SEQ and the K_ASME, in S42. However, according to this second embodiment, the MME will include an indication of said received NAS_U_SEQ in signal S43 transmitted to the eNodeB 12 together with the derived K_eNB, and the eNodeB will forward the NAS_U_SEQ to the UE, in signal S44. Thereafter, the UE will derive the K_eNB from at least the K_ASME and from the NAS_U_SEQ returned by the MME, in signal S45. From the derived security key, K_eNB, the eNodeB and the UE will establish the UP/RRC security context, thereby enabling secure UP/RRC traffic, in signal S46.

Figure 5:
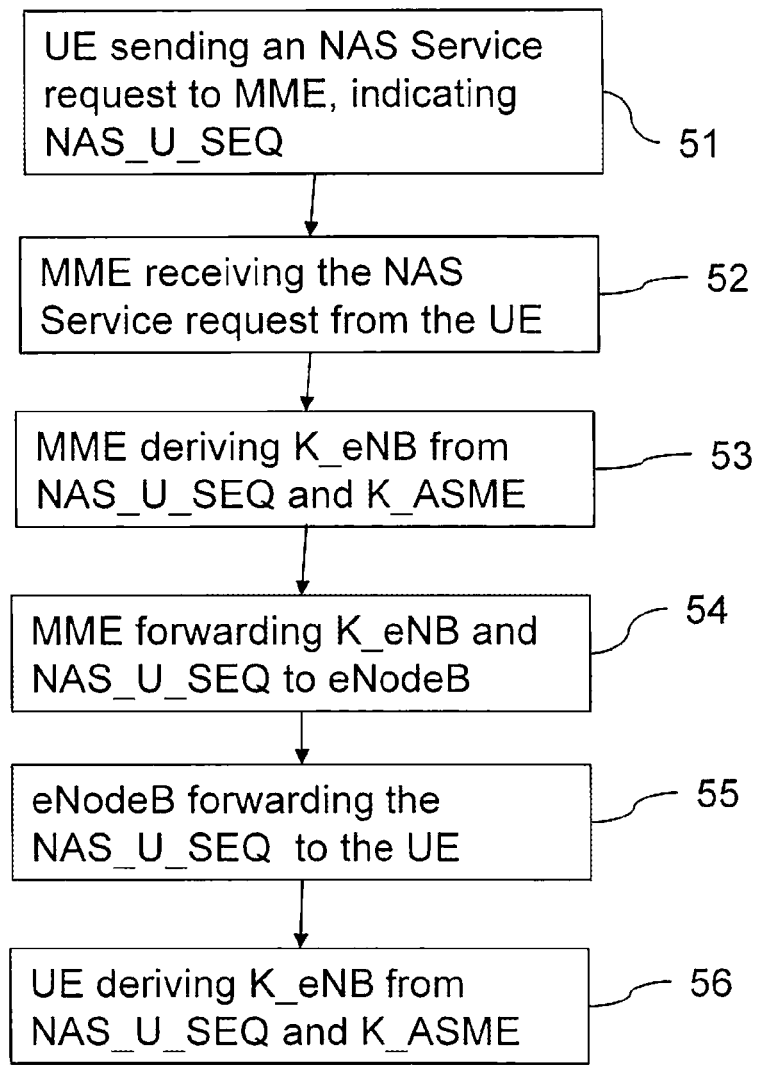
FIG. 5 is a flow diagram illustrating the second embodiment depicted in the FIG. 4.

FIG. 5 is a flow diagram illustrating the above-described method according to a second embodiment of this invention, in which an indication of the NAS_U_SEQ is returned to the UE by the MME. In step 41, the UE 11 sends the initial NAS SERVICE REQUEST-message to the MME 13, the message indicating the NAS uplink sequence counter, NAS_U_SEQ, normally the low order bits. In step 52, the MME receives the NAS SERVICE REQUEST-message from the UE, thereby obtaining the NAS_U_SEQ, and, if necessary, reconstructing the full NAS_U_SEQ from the received low order bits. In step 53, the MME derives the security key, K_eNB, from at least the received NAS_U_SEQ and the K_ASME, using a suitable key derivation function.

Thereafter, the MME includes an indication of the NAS uplink sequence counter, NAS_U_SEQ, in the message forwarding the derived K_eNB to the eNodeB 12, in step 54, and the eNodeB uses the received security key, K_eNB, for establishing a UP/RRC security context. The received NAS_U_SEQ is forwarded to the UE 11 by the eNodeB, in step 55, and in step 56, the UE derives the security key, K_eNB, from at least the K_ASME and from said received NAS_U_SEQ, in order to establish the UP/RRC security context shared with the eNodeB.

The derivation of the K_eNB by the MME, in the step 53, and by the UE, in the step 56, is performed by a suitable conventional key derivation function, e.g. a Pseudo-Random Function; K_eNB=PRF(K_ASME, NAS_U_SEQ, . . . ). Normally, the key derivation function will have additional conventional input values, e.g. the eNodeB-identity.

Figure 6A:
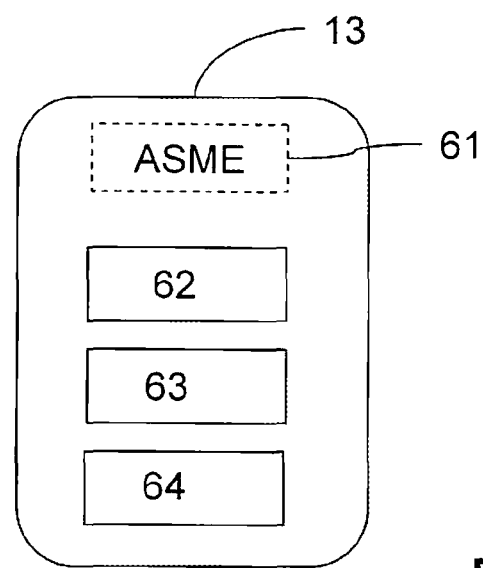
FIG. 6a illustrates schematically an MME (Mobility Management Entity), and the FIG. 6b illustrates schematically a UE, both provided with means for deriving the security key K_eNB.

FIG. 6*a* illustrates an MME 13 (Mobility Management Entity) for an EPS, according to this invention, further arranged to establish a security key, K_eNB, for a security context for the protection of UP/RRC traffic between a UE and a serving eNodeB. The MME is provided with conventional communication means, not illustrated in the figure, for communicating with the nodes in the EPS, e.g. with the eNodeBs via an S1-MME interface. Further, in the MME of FIG. 1, an ASME (Access Security Management Entity) 61 is illustrated by hatched lines, since this functional entity of an EPS may be co-located with the MME.

The means of the MME 13 illustrated in FIG. 6*a* for establishing the security key, K_eNB, comprises reception means 62 for receiving an NAS SERVICE REQUEST-message including an NAS_U-SEQ from a UE (via its serving eNodeB, key derivation means 63 for deriving a security key, K_eNB based on at least the received NAS_U-SEQ and a stored K_ASME, using a conventional key derivation function; and sending means 64 for sending the derived K_eNB to the eNodeB serving the UE.

Figure 6B:
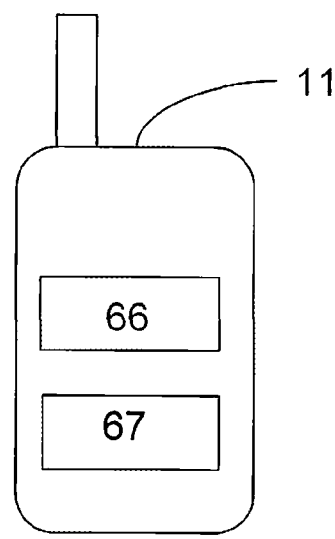

FIG. 6*b* illustrates a UE 11 (User Entity) according to this invention, the UE adapted for an EPS, and further arranged to establish a security key, K_eNB, for a security context for the protection of UP/RRC traffic exchanged with its serving eNodeB. The UE is provided with conventional communication means, not illustrated in the figure, for communicating with the nodes in the EPS via an LTE-Uu interface to its serving eNodeB.

The means of the UE 11 illustrated in the FIG. 6*b* for establishing the security key, K_eNB, comprises sending means 66 for sending an NAS SERVICE REQUEST-message to the MME, via the serving eNodeB, the request indicating an uplink sequence number, NAS_U-SEQ, and the means for establishing a security key, K_eNB, comprises key derivation means 67 for deriving a security key, K_eNB based on at least the NAS_U-SEQ and a stored K_ASME, using a conventional key derivation function.

The above-described means of the MME and the UE, as illustrated in the FIGS. 6*a* and 6*b*, implement the described functions using a suitable combination of software and hardware, e.g. a programmed microprocessor or an application-specific integrated circuit, as well as conventional radio transmitters and receivers.

While the invention has been described with reference to specific exemplary embodiments, the description is in general only intended to illustrate the inventive concept and should not be taken as limiting the scope of the invention.

The invention claimed is:

1. A method comprising:
    establishing, in a mobility management entity (MME), a security key for protecting Radio Resource Control/User Plane traffic between a User Equipment (UE) and a radio base station serving the UE, wherein establishing the security key comprises:
        Receiving a Non access Stratum (NAS) message containing a NAS service request from the UE, the NAS message indicating a NAS uplink sequence number;
        Deriving the security key from at least said indicated NAS uplink sequence number and from a stored access security management entity-key shared with said UE, using a key derivation function taking the NAS uplink sequence number and the stored access security management entity-key as inputs;
        Sending said derived security key to the radio base station serving said UE.

2. The method according to claim 1, wherein the key derivation function is a pseudo-random Function.

3. A method comprising:
    establishing, in a User Equipment (UE), a security key for protecting Radio Resource Control/User Plane traffic exchanged with a serving radio base station, wherein establishing the security key comprises:
    Sending a Non access Stratum (NAS) message containing a NAS service request to a mobility management entity (MME), the NAS message indicating a NAS uplink sequence number;
    Deriving the security key from at least said indicated NAS uplink sequence number and from a stored access security management entity-key shared with said mobility management entity, using a key derivation function taking the NAS uplink sequence number and the stored access security management entity-key as inputs.

4. The method according to claim 3, wherein the key derivation function is a pseudo-random Function.

5. The method according to claim 3, further comprising integrity protecting the NAS service request sent to the mobility management entity.

6. The method according to claim 3, further comprising storing the NAS uplink sequence number or the indication thereof of the NAS message sent to the mobility management entity.

7. The method according to claim 3, wherein the security key is derived from the NAS uplink sequence number and the access security management entity-key after the reception of a security configuration message from the radio base station.

8. The method according to claim 3, further comprising deriving, from the security key, a first encryption key for protecting the user plane traffic, and a second encryption key and an integrity protection key for protecting the Radio Resource Control traffic.

9. A mobility management entity (MME), the mobility management entity comprising:
processing circuitry;
wherein:
the mobility management entity is arranged to establish a security key for protection of Radio Resource Control/User Plane traffic between a user equipment (UE) and a radio base station serving the UE; and
the processing circuitry is configured to:
receive a Non access Stratum (NAS) message containing a NAS Service Request from the UE, the NAS message indicating a NAS uplink sequence number;
derive the security key from at least said indicated NAS uplink sequence number and from a stored access security management entity-key shared with said UE, using a key derivation function taking the NAS uplink sequence number and the stored access security management entity-key as inputs; and
send the derived security key to the radio base station serving said UE.

10. The MME according to claim 8, wherein the key derivation function is a pseudo-random Function.

11. A user equipment (UE), the UE comprising:
processing circuitry;
wherein:
the UE is arranged to establish a security key for protecting Radio Resource Control/User Plane traffic exchanged with a serving radio base station; and
the processing circuitry is configured to:
send a Non access Stratum (NAS) message containing a NAS service request to a mobility management entity (MME), the NAS message indicating a NAS uplink sequence number; and
derive the security key from at least said indicated NAS uplink sequence number and from a stored access security management entity-key shared with said mobility management entity, using a key derivation function taking the NAS uplink sequence number and the stored access security management entity-key as inputs.

12. The UE according to claim 11, wherein the key derivation function is a pseudo-random Function.

13. The UE according to claim 11, wherein the processing circuitry is further configured to integrity protect the NAS Service Request sent to the Mobility Management Entity.

14. The UE according to claim 11, wherein the processing circuitry is further configured to store the NAS uplink sequence number or the indication thereof of the NAS message sent to the mobility management entity.

15. The UE according to claim 11, wherein the security key is derived from the NAS uplink sequence number and the access security management entity-key after the reception of a security configuration message from the radio base station.

16. The UE according to claim 11, wherein the processing circuitry is further configured to derive, from the security key, a first encryption key for protecting the user plane traffic, as well as a second encryption key and an integrity protection key for protecting the Radio Resource Control traffic.

* * * * *

UNITED STATES PATENT AND TRADEMARK OFFICE
CERTIFICATE OF CORRECTION

Page 1 of 4

PATENT NO. : 11,917,055 B2
APPLICATION NO. : 17/366098
DATED : February 27, 2024
INVENTOR(S) : Blom et al.

It is certified that error appears in the above-identified patent and that said Letters Patent is hereby corrected as shown below:

On the Title Page

On Page 2, in Item (56), under "OTHER PUBLICATIONS", in Column 2, Lines 5-6, delete "Long Term Evolved (LTE)" and insert -- Long Term Evolution (LTE) --, therefor.

On Page 2, in Item (56), under "OTHER PUBLICATIONS", in Column 2, Lines 14-15, delete "Long Term Evolved (LTE)" and insert -- Long Term Evolution (LTE) --, therefor.

On Page 2, in Item (56), under "OTHER PUBLICATIONS", in Column 2, Lines 19-20, delete "Long Term Evolved (LTE)" and insert -- Long Term Evolution (LTE) --, therefor.

On Page 2, in Item (56), under "OTHER PUBLICATIONS", in Column 2, Line 27, delete "Tallin," and insert -- Tallinn, --, therefor.

On Page 2, in Item (56), under "OTHER PUBLICATIONS", in Column 2, Line 30, delete "(Security" and insert -- (Security) --, therefor.

On Page 2, in Item (56), under "OTHER PUBLICATIONS", in Column 2, Line 46, delete "Tallin" and insert -- Tallinn --, therefor.

On Page 2, in Item (56), under "OTHER PUBLICATIONS", in Column 2, Line 48, delete "Tallin" and insert -- Tallinn --, therefor.

On Page 3, in Item (56), under "OTHER PUBLICATIONS", in Column 1, Line 11, delete "S3-070652" and insert -- S3-070552 --, therefor.

On Page 3, in Item (56), under "OTHER PUBLICATIONS", in Column 1, Line 36, delete "3ra" and insert -- 3rd --, therefor.

Signed and Sealed this
Seventeenth Day of September, 2024

Katherine Kelly Vidal
*Director of the United States Patent and Trademark Office*

CERTIFICATE OF CORRECTION (continued)
U.S. Pat. No. 11,917,055 B2

On Page 3, in Item (56), under "OTHER PUBLICATIONS", in Column 1, Lines 40-42, delete "Serivce and System Aspects; Rationale and trac of security Decitions in Long Term Evolved (L TE)" and insert -- Service and System Aspects; Rationale and track of security Decisions in Long Term Evolution (LTE) --, therefor.

On Page 3, in Item (56), under "OTHER PUBLICATIONS", in Column 1, Lines 44-45, delete "Evolved Universal Terrestrial Radio Access (E-UTRAN):" and insert -- Evolved Universal Terrestrial Radio Access Network (E-UTRAN): --, therefor.

On Page 3, in Item (56), under "OTHER PUBLICATIONS", in Column 1, Line 52, delete "flied" and insert -- filed --, therefor.

On Page 3, in Item (56), under "OTHER PUBLICATIONS", in Column 2, Line 4, delete "S3-060961," and insert -- S3-060461, --, therefor.

On Page 3, in Item (56), under "OTHER PUBLICATIONS", in Column 2, Line 16, delete "Long Term Evolved (LTE)" and insert -- Long Term Evolution (LTE) --, therefor.

On Page 3, in Item (56), under "OTHER PUBLICATIONS", in Column 2, Line 63, delete "track fo" and insert -- track of --, therefor.

On Page 3, in Item (56), under "OTHER PUBLICATIONS", in Column 2, Line 63, delete "Long Term Evolved (LTE)" and insert -- Long Term Evolution (LTE) --, therefor.

On Page 4, in Item (56), under "OTHER PUBLICATIONS", in Column 1, Line 25, delete "sectirity" and insert -- security --, therefor.

On Page 4, in Item (56), under "OTHER PUBLICATIONS", in Column 1, Line 30, delete "readingroorn" and insert -- readingroom --, therefor.

On Page 4, in Item (56), under "OTHER PUBLICATIONS", in Column 1, Line 50, delete "Jul. 2001)." and insert -- (Jul. 2001). --, therefor.

On Page 4, in Item (56), under "OTHER PUBLICATIONS", in Column 1, Line 53, delete "Dierks. et al," and insert -- Dierks, et al. --, therefor.

On Page 4, in Item (56), under "OTHER PUBLICATIONS", in Column 2, Line 4, delete "B-I" and insert -- B-1 --, therefor.

On Page 4, in Item (56), under "OTHER PUBLICATIONS", in Column 2, Line 22, delete "Pad 2:" and insert -- Part 2: --, therefor.

On Page 4, in Item (56), under "OTHER PUBLICATIONS", in Column 2, Line 45, delete "2016." and insert -- 2015. --, therefor.

CERTIFICATE OF CORRECTION (continued)
U.S. Pat. No. 11,917,055 B2

On Page 4, in Item (56), under "OTHER PUBLICATIONS", in Column 2, Line 47, delete "Finland,"Response" and insert -- Finland, "Response --, therefor.

On Page 4, in Item (56), under "OTHER PUBLICATIONS", in Column 2, Line 49, delete "meeting #45 ,Ashburn," and insert -- meeting #45, Ashburn, --, therefor.

In the Drawings

In Fig. 2, Sheet 2 of 6, for Step "S21", in Line 1, delete "Msg(U_SEQ," and insert -- Msg(NAS_U_SEQ, --, therefor.

In Fig. 4, Sheet 4 of 6, and on the title page, the illustrative print figure, for Step "S43", in Line 1, delete "U_SEQ" and insert -- NAS_U_SEQ --, therefor.

In Fig. 4, Sheet 4 of 6, and on the title page, the illustrative print figure, for Step "S44", in Line 1, delete "U_SEQ" and insert -- NAS_U_SEQ --, therefor.

In Fig. 4, Sheet 4 of 6, and on the title page, the illustrative print figure, for Step "S41", in Line 1, delete "Msg(U_SEQ," and insert -- Msg(NAS_U_SEQ, --, therefor.

In the Specification

In Column 1, Line 7, delete "2019," and insert -- 2019, now U.S. Pat. No. 11,075,749, --, therefor.

In Column 2, Line 20, delete "eNobeB." and insert -- eNodeB. --, therefor.

In Column 2, Line 58, delete "S1-connenction" and insert -- S1-connection --, therefor.

In Column 3, Line 23, delete "claims" and insert -- claims. --, therefor.

In Column 5, Line 1, delete "practised" and insert -- practiced --, therefor.

In Column 5, Line 13, delete "concept or" and insert -- concept of --, therefor.

In Column 5, Line 38, delete "FIG. 1:" and insert -- FIG. 1. --, therefor.

In Column 5, Line 51, delete "en" and insert -- in --, therefor.

In Column 6, Line 19, delete "NAS NAS" and insert -- NAS --, therefor.

In Column 6, Line 56, delete "Mobility" and insert -- Management --, therefor.

In Column 6, Line 67, delete "initial NAS" and insert -- initial --, therefor.

In Column 7, Line 26, delete "step 41," and insert -- step 51, --, therefor.

CERTIFICATE OF CORRECTION (continued)
U.S. Pat. No. 11,917,055 B2

In Column 7, Line 66, delete "NAS_U-SEQ" and insert -- NAS_U_SEQ --, therefor.

In Column 7, Line 66, delete "(via" and insert -- via --, therefor.

In Column 7, Line 67, delete "eNodeB," and insert -- eNodeB; --, therefor.

In Column 8, Lines 1-2, delete "NAS_U-SEQ" and insert -- NAS_U_SEQ --, therefor.

In Column 8, Line 5, delete "(User Entity)" and insert -- (User Equipment) --, therefor.

In Column 8, Line 17, delete "NAS_U-SEQ," and insert -- NAS_U_SEQ, --, therefor.

In Column 8, Line 20, delete "NAS_U-SEQ" and insert -- NAS_U_SEQ --, therefor.

In the Claims

In Column 8, Line 39, in Claim 1, delete "Receiving" and insert -- receiving --, therefor.

In Column 8, Line 42, in Claim 1, delete "Deriving" and insert -- deriving --, therefor.

In Column 8, Line 48, in Claim 1, delete "Sending" and insert -- sending --, therefor.

In Column 8, Line 57, in Claim 3, delete "Sending" and insert -- sending --, therefor.

In Column 8, Line 61, in Claim 3, delete "Deriving" and insert -- deriving --, therefor.

In Column 10, Line 1, in Claim 10, delete "claim 8," and insert -- claim 9, --, therefor.